(12) United States Patent
Maganga et al.

(10) Patent No.: US 11,169,493 B2
(45) Date of Patent: Nov. 9, 2021

(54) CONTROL SYSTEM

(71) Applicant: COVENTRY UNIVERSITY, Coventry (GB)

(72) Inventors: Othman George Maganga, Birmingham (GB); Navneesh Phillip, Coventry (GB); Keith Burnham, Atherstone (GB)

(73) Assignee: COVENTRY UNIVERSITY, Coventry (GB)

( * ) Notice: Subject to any disclaimer, the term of this patent is extended or adjusted under 35 U.S.C. 154(b) by 534 days.

(21) Appl. No.: 16/087,950

(22) PCT Filed: Mar. 23, 2017

(86) PCT No.: PCT/GB2017/050816
§ 371 (c)(1),
(2) Date: Sep. 24, 2018

(87) PCT Pub. No.: WO2017/163073
PCT Pub. Date: Sep. 28, 2017

(65) Prior Publication Data
US 2020/0319608 A1 Oct. 8, 2020

(30) Foreign Application Priority Data
Mar. 23, 2016 (GB) .................................. 1604935

(51) Int. Cl.
*G05B 13/02* (2006.01)
*G05B 19/418* (2006.01)
*G06F 17/18* (2006.01)

(52) U.S. Cl.
CPC ......... *G05B 13/025* (2013.01); *G05B 19/418* (2013.01); *G06F 17/18* (2013.01)

(58) Field of Classification Search
CPC ...... G05B 13/025; G05B 19/418; G06F 17/18
See application file for complete search history.

(56) References Cited

U.S. PATENT DOCUMENTS

| | | | |
|---|---|---|---|
| 6,577,908 B1 * | 6/2003 | Wojsznis | G05B 17/02 |
| | | | 700/42 |
| 6,885,923 B1 * | 4/2005 | Faymon | G05B 9/02 |
| | | | 701/100 |

(Continued)

OTHER PUBLICATIONS

Grimble, "Non-linear generalized minimum variance feedback, feedforward and tracking control", 2005, Industrial Control Centre, University of Strathclyde, Glasgow, G1 1QE, UK, pp. 1-13 (Year: 2005).*

(Continued)

*Primary Examiner* — Mohammad Ali
*Assistant Examiner* — David Earl Ogg
(74) *Attorney, Agent, or Firm* — McDonnell Boehnen Hulbert & Berghoff LLP

(57) ABSTRACT

A control system (1) for controlling a plant (2) comprises a feedback loop including an integrator (7); a signal generator (32); and a scaling unit (10). The feedback loop comprises an input suitable for connection to an output (18) of the plant. The integrator integrates a signal received from the input to generate a state signal x. The signal generator generates a periodic base perturbation signal (34) with an initial amplitude. The scaling unit generates a scaling factor (30) having a first value if the variance of the state signal var(x) is zero, or a second value if the variance of the state signal is non-zero, wherein the second value is proportional to (formulae 1) The scaling unit is arranged to multiply (16) the initial amplitude of the periodic base perturbation signal by the scaling factor to produce a state dependent perturbation signal (35, 36), which is applied to an input of the plant.

20 Claims, 3 Drawing Sheets

(56) References Cited

U.S. PATENT DOCUMENTS

| | | | |
|---|---|---|---|
| 10,845,070 B2* | 11/2020 | Salsbury | .................. F24F 11/83 |
| 2013/0046396 A1* | 2/2013 | Blevins | .............. G05B 23/0251 |
| | | | 700/52 |

OTHER PUBLICATIONS

The International Search Report (ISR) with Written Opinion for PCT/GB2017/050816 dated Jun. 14, 2017, pp. 1-14.

Nwesaty, Waleed et al. "Extremum seeking control techniques applied to photovoltaic systems with multimodal power curves," International Conference on Renewable Energy Research and Applications (2013), pp. 85-90.

Great Britain Search Report for GB1604935.5 dated Sep. 23, 2016, pp. 1-3.

Moura, Scott J. et al. "Lyapunov-based Switched Extremum Seeking for Photovoltaic Power Maximization," Mechanical and Aerospace Engineering (2013), pp. 1-29.

Latham, Alexander M. et al. "Optimization of a Continuous-Time Maximum Power Point Tracking Algorithm in the Presence of Noise," Control and Modeling for Power Electronics (2010) IEEE 12th workshop, pp. 1-7.

Latham, Alexander M. et al. "Analysis and Optimization of Maximum Power Point Tracking Algorithms in the Presence of Noise," IEEE Transactions on Power Electronics (2013) vol. 28(7), pp. 3479-3494.

Leyva, R. et al. "MPPT of Photovoltaic Systems using Extremum—Seeking Control," IEEE Transactions on Aerospace and Electronic Systems (2006) vol. 42(1), pp. 249-258.

Yau, Her-Terng et al. "Comparison of Extremum-Seeking Control Techniques for Maximum Power Point Tracking in Photovoltaic Systems," Energies (2011) vol. 4, pp. 2180-2195.

Brunton, Steven L. et al. "Maximum Power Point Tracking for Photovoltaic Optimization Using Ripple-Based Extremum Seeking Control," IEEE Transactions on Power Electronics (2010) vol. 25(10), pp. 2531-2540.

* cited by examiner

CONTROL SYSTEM

CROSS-REFERENCE

This application is a section 371 U.S. National phase of PCT/GB2017/050816, filed Mar. 23, 2017 which claims priority from GB 1604935.5, filed Mar. 23, 2016, which are incorporated by reference in their entirety.

BACKGROUND OF THE INVENTION

It is a common goal in control engineering to determine the optimum value at which to set one or more input parameters of a plant (i.e. an actuator and associated process) in order to achieve a particular output value. For example, in so-called maximum power point tracking (MPPT) applications, the output voltage of a power source (e.g. a photovoltaic cell) may be varied in order to optimise the power efficiency of said power source. The radiant power output of a solar cell typically involves rapid variations that must be accommodated.

Such a control system usually seeks to find a minimum or maximum point of a corresponding function. Such maximum and minimum points are often referred to as "extrema". There are a number of methods known in the art per se that seek to achieve this goal.

One commonly used approach known as the "perturb and observe" (P&O) method (sometimes referred to as the "hill climbing" method) involves adjusting the output voltage by a small amount and measuring the output power. If the power increases, the adjustment is deemed to have been beneficial and further adjustments are made in the same direction until the power ceases to improve. However, this method can result in the presence of oscillations in power output.

A common approach known as "extremum seeking control" (ESC) utilises a periodic (usually sinusoidal) perturbation signal to excite a plant of interest. A feedback loop then allows for a shift in the average value of the perturbation signal based on the output of the plant, so as to drive it to the desired value. The amplitude of the perturbation signal is chosen during design of the ESC system to provide convergence to the desired value. Higher amplitudes will lead to faster convergence but introduce oscillations and losses to the output, whereas lower amplitudes may fail to excite the plant at all. Furthermore, such ESC systems may enter a limit cycle (i.e. a stable loop) at a local extremum and thus prevent attainment of the global extremum (i.e. the global maximum or minimum as appropriate to the application).

SUMMARY OF THE INVENTION

The present invention seeks to provide an improved control system that can provide fast convergence to the correct extremum while maintaining the stability and simplicity of conventional ESC systems.

The present invention provides a control system (1) for controlling a plant (2). The control system comprises a feedback loop including an integrator (7); a signal generator (32); and a scaling unit (10). The feedback loop comprises an input suitable for connection to an output (18) of the plant. The integrator integrates a signal received from the input to generate a state signal $\hat{\alpha}$. The signal generator generates a periodic base perturbation signal (34) with an initial amplitude. The scaling unit generates a scaling factor (30) having a first value if the variance of the state signal var($\hat{x}$) is zero, or a second value if the variance of the state signal is non-zero, wherein the second value is proportional to $$\frac{1}{e^{var(\hat{x})}}.$$

The scaling unit is arranged to multiply (16) the initial amplitude of the periodic base perturbation signal by the scaling factor to produce a state dependent perturbation signal (35, 36), which is applied to an input of the plant.

DESCRIPTION OF THE DRAWINGS

Certain embodiments of the invention will now be described, by way of example only, with reference to the accompanying drawings in which.

DETAILED DESCRIPTION OF THE INVENTION

Figure 1:
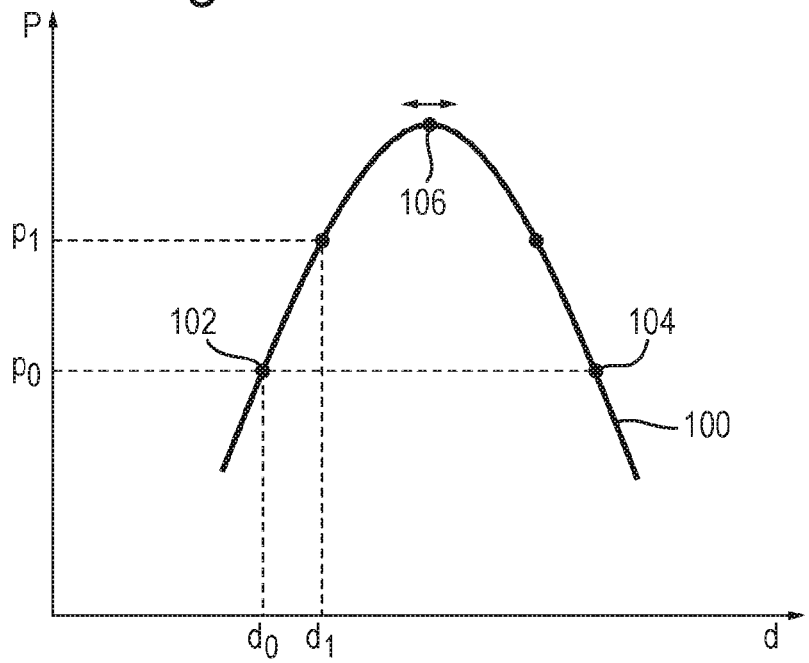
FIG. 1 shows a graph that illustrates a typical extremum that might be located using the present invention.

Thus when viewed from a first aspect, the present invention provides a control system for controlling a plant, the control system comprising a feedback loop including an integrator, a signal generator, and a scaling unit, wherein the control system is arranged such that:

the feedback loop comprises an input suitable for connection to an output of the plant;

the integrator integrates a signal received from the input to generate a state signal $\hat{x}$;

the signal generator generates a periodic base perturbation signal with an initial amplitude;

the scaling unit generates a scaling factor having a first value if the variance of the state signal var($\hat{x}$) is zero, or a second value if the variance of the state signal is non-zero, wherein the second value is proportional to $$\frac{-1}{e^{var(\hat{x})}};$$

wherein the scaling unit is arranged to multiply the initial amplitude of the periodic base perturbation signal by the scaling factor to produce a state dependent perturbation signal, which is provided at an output of the control system suitable for connection to an input of the plant.

Thus it will be appreciated by those skilled in the art that the present invention provides an improved, state dependent parameter extremum seeking control (SDP-ESC) system that is able to vary the amplitude of the perturbation signal according to the variance of the state signal. That is to say, when the output of the plant is close to the desired value, the variance of the state signal will remain minimal, and the scaling unit thus reduces the amplitude of the perturbation signal. Accordingly, this means that a perturbation signal with an amplitude large enough to excite the plant can be applied, but then subsequently reduced in order to avoid undesirable oscillations and losses within the plant once the desired value of the plant's output is reached. This may be particularly beneficial, for example, in applications involving a low voltage output which may not be suitably excited by existing ESC methods. Additionally, SDP-ESC is able to adapt to rapid input variations and thus it can be beneficial when applied to plants such as photovoltaic cells where rapid variations typically occur.

The improved control system of the present invention can be readily applied to a great number of technical applications, including but not limited to: renewable energy resources such as photovoltaics (e.g. solar cells) and wind turbines; fuel cells; anti-lock braking systems (ABS); bioreactors; combustion instabilities; flight formation; heating and cooling e.g. air conditioning systems; thermoelectric generators; and flow control problems.

For example, a control system according to embodiments of the present invention may be applied within an ABS system to seek a maximum friction characteristic in order to prevent skidding. The characteristic of the friction force acting on the tires has a maximum for a low (non-zero) wheel slip and decreases as the slip increases.

For example, a control system according to embodiments of the present invention may be used in optimisation of bioreactors in order to allow automated seeking of the best operating point while being robust against a large uncertainty regarding the process kinetics. For instance, such control systems could be used to adjust dilution rate in order to steer the process to the extremum.

For example, a control system according to embodiments of the present invention may be used in combustion instabilities optimisation. Some parameters that can be optimised include phase shift. The equilibrium map of pressure amplitude versus control phase is smooth, unique, and has a minimum. Therefore such control systems can be used to alter phase angle in order to search for minimum pressure amplitude.

In some embodiments, the second value has a lower limit substantially equal to the first value. The second value can then be initiated to a relatively high value, such that the state dependent perturbation signal is almost certain to excite the plant, and then reduced to the first value as the variance of the state signal decreases.

In some embodiments, the reciprocal of the variance of the state signal is scaled by a non-zero constant $\alpha$. If $\alpha=0$ were to be selected there would be no effect on limit cycle minimisation and hence the SDP-ESC control system would give the same performance as standard ESC systems. Preferably, the constant $\alpha$ is positive, in other words a decay constant $\alpha>0$. If $\alpha<0$ were to be selected then the state dependent perturbation signal would increase exponentially and cause instability to the control system. This means that the scaled result $$\frac{-\alpha}{\mathrm{var}(\hat{x})}$$

may provide the exponent for the second value, such that the second value is proportional to $$e^{\frac{-\alpha}{\mathrm{var}(\hat{x})}}.$$

Preferably the second value of the scaling factor is $$\beta e^{\frac{-\alpha}{\mathrm{var}(\hat{x})}},$$

wherein $\alpha$ is a decay constant chosen to set the rate of exponential decay of the scaling factor and $\beta$ is a perturbation gain. The Applicant has recognised that various parameters affecting the state dependent perturbation signal can be selected for optimisation of the control system.

While any shape waveform could be used to provide the periodic base perturbation signal, in preferred embodiments the periodic base perturbation signal is sinusoidal. In other words, the signal generator is preferably arranged to generate a periodic base perturbation signal of the form $\sin \omega t$ or $\cos \omega t$. It has been found that selection of the perturbation frequency $\omega$ can be important to avoid tracking error. Preferably the frequency $\omega$ of the periodic base perturbation signal is not equal to the frequency of any significant noise components affecting the control system. If the perturbation frequency $\omega$ were to be equal to noise frequency, then tracking error increases. Accordingly a function $f_n$ representing noise in the control system is preferably bounded according to:

$$f_n = \lim_{T \to \infty} \frac{1}{T} \int_0^T n \sin \omega t \, dt.$$

In addition, or alternatively, the scaling unit is preferably arranged to produce a state dependent perturbation signal having a gain $\beta$ that is large enough to excite the control system, as well as achieving a desired convergence speed. In a preferred set of embodiments the second value of the scaling factor is $$\beta e^{\frac{-\alpha}{\mathrm{var}(\hat{x})}},$$

wherein $\alpha$ is a decay constant which can be chosen to set the rate of exponential decay of the scaling factor. Thus the state dependent perturbation signal may be represented as a function of the state signal $\hat{x}$ according to:

$$f(\hat{x}) = \begin{cases} \beta e^{\frac{-\alpha}{\mathrm{var}(\hat{x})}}, & \text{if } \mathrm{var}(\hat{x}) < \alpha \text{ and } \mathrm{var}(\hat{x}) \neq 0 \\ \beta, & \text{otherwise} \end{cases}.$$

A large perturbation gain $\beta$ will increase the convergence speed with minimum oscillations due to the exponentially decaying effect caused by the SDP-ESC function $$e^{\frac{-1}{\mathrm{var}(\hat{x})}}.$$

As this function will decay exponentially close to zero, β can be selected to increase the rate of convergence to the extremum, as well as providing sufficient excitation to the system.

A benefit of selecting α>0 is that $f(\hat{x})$ then allows the perturbation gain β to decay exponentially to a small value, therefore selecting a large value for β does not introduce oscillations or sensitivity to noise. The Applicant has realised that the constant α can be selected in dependence on the state signal var($\hat{x}$) and preferably the constant α is selected such that var($\hat{x}$)<α.

In a preferred set of embodiments the state dependent perturbation signal may be represented as a function of the state signal $\hat{x}$ according to:

$$f(\hat{x}) = \begin{cases} \beta e^{-\gamma}, & \text{var}(\hat{x}) < \alpha \text{ and } \text{var}(\hat{x}) \neq 0 \\ \beta, & \text{otherwise} \end{cases};$$

wherein $$\gamma = \frac{\alpha}{\text{var}(\hat{x})}.$$

In at least some embodiments var($\hat{x}$) is assumed to be a windowed variance and hence γ is considered to be constant for a period of time.

In at least some embodiments, the feedback loop comprises a shifting unit arranged to provide an offset value. This permits the average value of the perturbation signal to be increased or decreased as required in order for the output of the plant to converge to the desired value. While the offset could be added before or after the scaling process, in preferred embodiments the shifting unit is arranged such that the offset value is added to the state dependent perturbation signal. There are a number of possible shifting unit arrangements suitable for providing the offset value, however in preferred embodiments the shifting unit is a compensator. In further preferred embodiments, the compensator is a proportional-integral-derivative (PID) controller.

In at least some embodiments, alternatively or in addition, the feedback loop comprises a high pass filter having a cut-off frequency $\omega_h$. It is preferable that this cut-off frequency satisfies $\omega_h \ll \omega$, where ω is the frequency of the periodic base perturbation signal (as described above). This ensures that the function of the high pass filter is bounded so that the high pass filter removes any unwanted DC components. The dynamics of the high pass filter are preferably chosen to be sufficiently fast enough to respond to perturbations in the input.

In at least some embodiments, alternatively or in addition, the feedback loop comprises a low pass filter having a cut-off frequency $\omega_l$. It is preferable that this cut-off frequency satisfies $\omega_l \ll \omega$, where ω is the frequency of the periodic base perturbation signal (as described above). This ensures that the low pass filter always attenuates any unwanted high frequency components. The dynamics of the low pass filter are preferably chosen to be sufficiently fast enough to respond to perturbations in the input.

In at least some embodiments, alternatively or in addition, the feedback loop comprises a bandpass filter comprising a high pass filter with a first corner frequency and a low pass filter with a second corner frequency wherein the first corner frequency is greater than the second corner frequency. In preferred embodiments, the bandpass filter is arranged to filter the input before passing the filtered input signal to the integrator. In some embodiments, the output of the high pass filter is multiplied with the periodic base perturbation signal prior to passing through the low pass filter. A low pass filter is not essential for convergence analysis as the integrator can attenuate high frequencies, however a low pass may often be present in practical implementations of the feedback loop.

The Applicant has appreciated that in time-based systems, feedback loops are often slower than the plant that they are designed to control, and thus it is advantageous to ensure that the filters described above are faster than the scaling unit. Thus in preferred embodiments as outlined above, the decay constant α is chosen such that the scaling unit is slower than the high pass filter. In particularly preferred embodiments, the scaling unit is 2 to 10 times slower than the high pass filter.

The present invention extends to a method of controlling a plant, the method comprising:
  obtaining an output signal from the plant;
  integrating the output signal from the plant to generate a state signal $\hat{x}$;
  generating a periodic base perturbation signal with an initial amplitude;
  generating a scaling factor having a first value if the variance of the state signal var($\hat{x}$) is zero, or a second value if the variance of the state signal is non-zero, wherein the second value is proportional to $$e^{\frac{-1}{\text{var}(\hat{x})}};$$

multiplying the initial amplitude of the periodic base perturbation signal by the scaling factor to produce a state dependent perturbation signal;
  inputting the state dependent perturbation signal to the plant so as to drive the plant to a desired operating point.

Embodiments of such a method may implement any of the features described hereinabove in relation to a control system.

FIG. 1 shows a graph that illustrates a typical extremum that might be located using the present invention. The curve 100 shows the relationship between the output P of a plant to be controlled and the input d to said plant. The input d can be controlled e.g. between two points 102, 104 on the curve 100, which varies the output P.

As can be seen from the curve 100, starting at point 102, the plant produces an initial output $p_0$ for a given input $d_0$. Moving towards the second point 104 by increasing the input to $d_1$ causes the output to increase to $p_1$. From this simple curve, it can be seen that eventually a maximum point 106 is reached. At the optimum point 106, the first derivative (i.e. the gradient) of the curve 100 is zero and it is therefore a stationary point. Furthermore, the second derivative of the curve 100 at the optimum point 106 is negative and therefore the stationary point is a maximum.

It is extrema such as this optimum point 106 which the present invention seeks to locate. While this curve 100 has a relatively simple relationship between the output P and the input d, it will be appreciated that the principles of the invention described herein apply to applications with far more complex input-output relationships.

Figure 2:
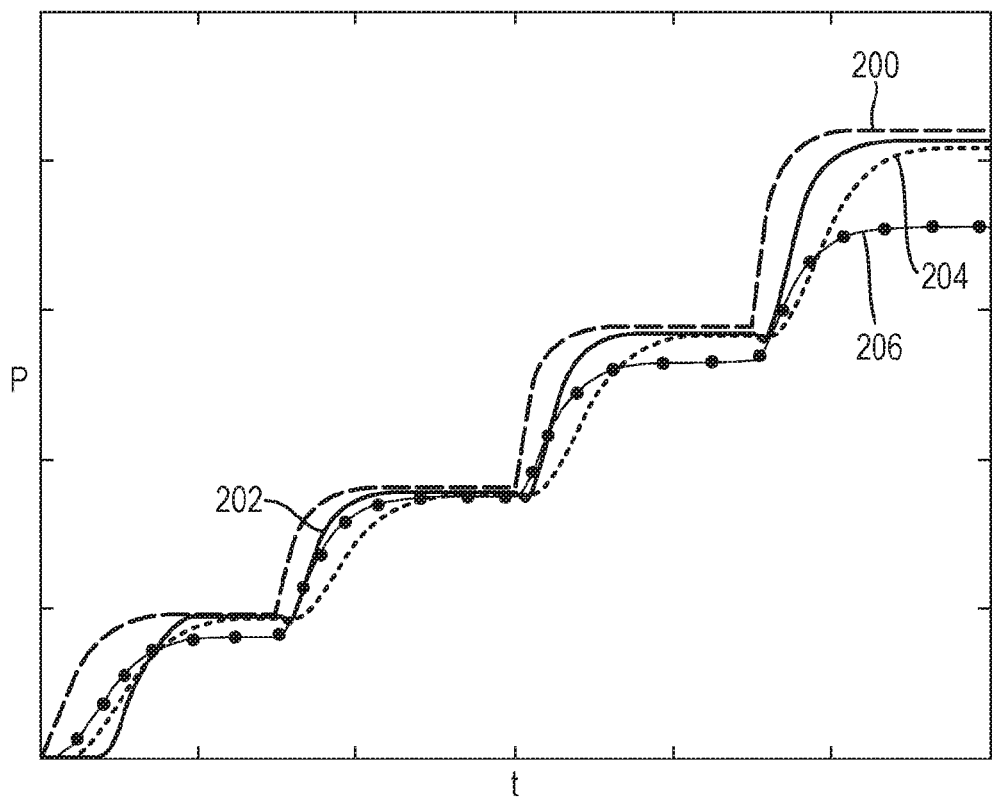
FIG. 2 shows the simulated performance of two conventional control systems.

FIG. 2 shows the simulated performance of two conventional control systems. More specifically, it is a simulation of the performance of a $Bi_2Te_3$ thermoelectric generator (TEG), simulating the output power P as a function of time t using different control methods.

The curve 200 depicted by the thicker dashed line shows the theoretical maximum performance of the TEG. The curve 206 depicted by the solid line with circular markers shows the performance of the TEG with no control mechanism used (i.e. the input is fixed).

A simulation of the results associated with controlling the TEG with the conventional perturb and observe (P&O) method as previously mentioned is shown by PO curve 204, while a simulation of a conventional Extremum Seeking Control (ESC) method ESC curve 202. While the ESC method begins further from the theoretical maximum than the PO method, as can be seen from the graph the ESC curve 202 on average is closer than the PO curve 204 to the theoretical curve 200 and converges faster. This indicates enhanced performance and greater convergence towards the optimal output power of the TEG.

However, as described previously, the ESC method must utilise a perturbation signal with a high amplitude in order to achieve convergence to the desired value. This high amplitude introduces oscillations and losses to the output, as will be described below with reference to FIGS. 4 to 6.

Figure 3:
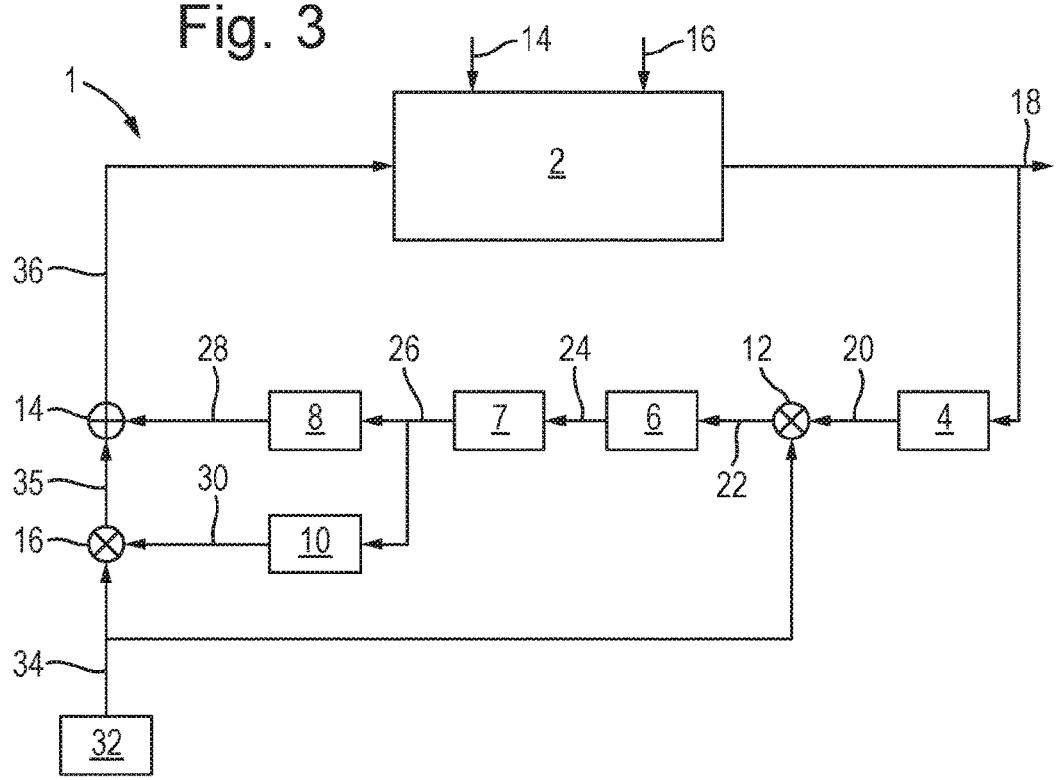
FIG. 3 shows a block diagram of an SDP-ESC control system in accordance with an embodiment of the invention.

FIG. 3 shows a block diagram of a state dependent parameter extremum seeking control (SDP-ESC) system 1 in accordance with an embodiment of the invention. The control system 1 is arranged as a loop containing: a plant 2; a high pass filter 4; a low pass filter 6; an integrator 7; a compensator 8; a scaling unit 10; multipliers 12, 16; an adder 14; and a signal generator 32.

The plant 2 is the entity to be controlled by the control system 1, which as previously described might, for example, be: a thermoelectric generator; a photovoltaic cell; a wind turbine; a fuel cell; an anti-lock braking system; or a bio-reactor.

In order to control the plant 2, it is perturbed using a periodic perturbation signal—in this particular embodiment, a sinusoidal signal 34 generated by the signal generator 32. However, rather than simply using the "perturb and observe" method outlined previously, this sinusoidal signal 34 is modulated by the control loop to achieve rapid convergence to a desired operating point within the plant 2. The sinusoidal signal 34, representing a periodic base perturbation signal having a perturbation frequency $\omega$, may take the general form sin $\omega t$.

The plant 2 produces an output 18, which is monitored by the control system 1. The output 18 is fed to the high pass filter 4 which filters any low frequency components from the output below an upper corner frequency, $\omega_h$, which generates a high pass filtered signal 20. The transfer function of the high pass filter 4 in the Laplace domain is given by Eq. 1 below:

Transfer function of high pass filter 4    Eq. 1

$$F_{hpf}(s) = \frac{s}{s+\omega_h}$$

wherein: $f_{hpf}(s)$ is the transfer function of high pass filter 4; s is the complex frequency; and $\omega_h$ is the upper corner frequency.

The high pass filtered signal 20 is then input to the first multiplier 12, which is also fed with the periodic perturbation signal 34. The multiplier 12 then generates a mixed signal 22.

The resulting mixed signal 22 is then input to the low pass filter 6, which filters any low frequency components from the output below a lower corner frequency, $\omega_l$, which generates a low pass filtered signal 24. The transfer function of the low pass filter 7 in the Laplace domain is given by Eq. 2 below:

Transfer function of low pass filter 6    Eq. 2

$$F_{lpf}(s) = \frac{\omega_l}{s+\omega_l}$$

wherein: $f_{lpf}(s)$ is the transfer function of low pass filter 6; s is the complex frequency; and $\omega_l$ is the lower corner frequency.

The low pass filtered signal 24 is then input to the integrator 7. The integrator 7 is arranged to sum the low pass filtered signal 24 over time, generating a state signal 26. This state signal 26 is then input to both the compensator 8 and the scaling unit 10. The transfer function of the integrator 7 in the Laplace domain is given by Eq. 3 below:

Transfer function of the integrator 7    Eq. 3

$$F_{int}(s) = \frac{k}{s}$$

wherein: $F_{int}(s)$ is the transfer function of low pass filter 7; s is the complex frequency; and k is a constant.

The scaling unit 10 is arranged to produce a gain factor 30 depending on the variance of the state signal 26. If the variance of the state signal 26 is zero, the gain factor 30 is set to a first value $\beta$, where this first value $\beta$ is sufficiently large to be able to excite the plant 2. However, if the variance of the state signal 26 is non-zero, the gain factor 30 is set to a second value proportional to $$e^{\frac{-1}{var(\hat{x})}}.$$

The relationship is shown mathematically below in Eq. 4:

State signal dependent function    Eq. 4

$$f(\hat{x}) = \begin{cases} \beta e^{\frac{-\alpha}{var(\hat{x})}}, & \text{if } var(\hat{x}) < \alpha \text{ and } var(\hat{x}) \neq 0 \\ \beta, & \text{otherwise} \end{cases}$$

wherein: $\hat{x}$ is the state signal 26; $f(\hat{x})$ is the gain factor 30; $\beta$ is the first value as described above; and $\alpha$ is a decay constant which can be chosen to set the rate of exponential decay with respect to the state signal 26.

Because, at least in time-based systems, the plant 2 has a faster response to changes than the feedback loop, the decay constant $\alpha$ is chosen such that the filters 4, 6 are faster than the exponential function that sets the gain factor 30. The decay constant $\alpha$ is therefore dependent on the dynamics of the plant 2 to be controlled, and a is then chosen after the upper and lower filter corner frequencies $\omega_h$ and $\omega_l$ are set.

The resulting gain factor 30 is applied as an input to the multiplier 16, which is also provided with the sinusoidal signal 34. This multiplier 16 then generates a scaled sinusoidal signal 35.

The compensator 8 is arranged to produce an offset value 28 that will be applied to the sinusoidal signal 34. While the scaling unit 10 scales the amplitude of the perturbation signal to be applied to the plant 2, the compensator 8 is arranged to shift the average value of the perturbation signal up or down as appropriate for optimal convergence to the desired operating point. Accordingly, the compensator 8 uses proportional-integral control based on the state signal 26 to generate the offset value 28. This offset value 28 is then input to the adder 14 along with the scaled sinusoidal signal 35 to generate a state-dependent perturbation signal 36, which is then input to the plant 2. The transfer function of the compensator 8 in the Laplace domain is given below in Eq. 5:

Transfer function of the compensator 8    Eq. 5

$$F_{comp}(s) = \frac{sk_c + 1}{s}$$

wherein: $F_{comp}(s)$ is the transfer function of the compensator 8; s is the complex number frequency; and $k_c$ is a constant.

In relation to the integrator 7 and compensator 8, the constants $k_c$ and k should be chosen to be sufficiently large so as to adapt to deliberate perturbations while avoiding the detection of small variations caused by noise. In other words, these parameters should be selected such that, noise is not detected within the SDP-ESC feedback loop. However, if $k_c$ and k are too large, this may increase oscillations due to continuous detection of every small variation within the feedback loop.

This control system 1 is arranged such that the feedback loop then allows for a dynamically variable state-dependent perturbation signal 36 based on the output 18 of the plant 2, so as to drive the output 18 to the desired value. The plant 2 itself has a transfer function expressed below in Eq. 6:

Transfer function of the plant 2    Eq. 6

$$f(d) = P_{max} + \frac{P''}{2}(d - d_{opt})^2$$

wherein: $f(d)$ is the transfer function of the plant 2; d is the state-dependent perturbation signal 36; $P_{max}$ is the maximum theoretical output of the plant 2; $d_{opt}$ is the theoretical optimum perturbation signal and P" is the second derivative of the output 18 of the plant 2.

For example, if the control system of the present invention were to be used to control the output of a thermoelectric generator (TEG) such that it provides maximum power transfer to a load, the desired output voltage from the plant 2 (i.e. the photovoltaic cell) $P_{max}$ would be half of the open circuit voltage of the TEG.

Using the TEG as a worked example, first consider a model of the TEG (i.e. the plant 2) approximated using a Taylor series expansion as per Eq. 7:

Taylor series expansion of a TEG    Eq. 7

$$y(u) = y^* + \frac{y''}{2}(u - u^*)^2$$

where in u is the duty cycle, u* is the duty cycle at the extremum point, y is the measured output and y* is the output at the extremum point.

Two assumptions can be made. Firstly, it is assumed that the low pass filter 6 is not essential for convergence analysis since the integrator 7 will typically attenuate high frequencies. However, it should be noted that for practical implementations the low pass filter 6 will be included. The second assumption made here is that the while the TEG model will include other dynamics, the state-dependent perturbation signal 36 used in the control system 1 is considered to be sufficiently slow so as to treat the plant 2 as a static nonlinear map.

The objective of SDP-ESC is to minimise the quantity (u*−û) such that the measured output y approaches y* i.e. y(u)≈y*. The difference between u* and û is called estimation error $u_e$ and is given as per Eq. 8 below:

$$u_e = u^* - \hat{u}$$    Eq. 8: Estimation error

This quantity û is modulated such by $f(\hat{x}) \sin \omega t$ to obtain u. The difference between u and u* is given as per Eq. 9:

$$u - u^* = f(\hat{x})\sin \omega t - u_e$$    Eq. 9: Difference between u and u*

Substituting Eq. 9 into Eq. 8 reformulates the objective of SDP-ESC as per Eq. 10:

Reformulated objective of SDP-ESC    Eq. 10

$$y(u) = y^* + \frac{y''}{2}(u_e - f(\hat{x})\sin\omega t)^2$$

Furthermore, if $var(\hat{x}) > \alpha$ and $var(\hat{x}) \neq 0$, substituting Eq. 4 into Eq. 10 provides Eq. 11:

Reformulated objective of SDP-ESC    Eq. 11 using state dependent parameter function $$y(u) = y^* + \frac{y''}{2}(u_e - \beta e^{-\gamma}\sin\omega t)^2$$

where $\gamma = \frac{\alpha}{var(\hat{x})}$.

Expanding Eq. 11 and replacing $\sin \omega t$ with ½(1−cos 2ωt) yields Eq. 12:

Expanded objective of SDP-ESC    Eq. 12 using state dependent parameter function $$y(u) = y^* + \frac{y''u_e^2}{2} + \frac{y''}{4}\beta^2 e^{-2\gamma} - y''u_e \beta e^{-\gamma}\sin\omega t - \frac{y''}{4}\beta^2 e^{-2\gamma}\cos 2\omega t$$

The high-pass filter 4 will remove any slow DC component of y and thus Eq. 12 can be approximated as:

Approximation after high-pass filter 4    Eq. 13

$$\frac{s}{s + \omega_h}[y] \approx$$

$$y^* + \frac{y''u_e^2}{2} + \frac{y''}{4}\beta^2 e^{-2\gamma} - y''u_e \beta e^{-\gamma}\sin\omega t - \frac{y''}{4}\beta^2 e^{-2\gamma}\cos 2\omega t$$

The signal of Eq. 13 is then demodulated by multiplying with the dither signal sin ωt to obtain:

Demodulated signal post-dithering     Eq. 14

$$\xi \approx \frac{y'' u_e^2}{2}\sin\omega t + \frac{y''}{4}\beta^2 e^{-2\gamma}\sin\omega t - y'' u_e \beta e^{-\gamma}\sin^2 \omega t - \frac{y''}{4}\beta^2 e^{-2\gamma}\cos 2\omega t \sin\omega t$$

By replacing the cos 2ωt sin ωt term with the identity ½(sin 3ωt−sin ωt) demodulated signal in Eq. 14 yields Eq. 15 below:

Demodulated signal post-dithering     Eq. 15

$$\xi \approx \frac{y'' u_e^2}{2}\sin\omega t + \frac{y''}{4}\beta^2 e^{-2\gamma}\sin\omega t - y'' u_e \beta e^{-\gamma}\sin^2 \omega t - \frac{y''}{8}\beta^2 e^{-2\gamma}(\sin 3\omega t - \sin\omega t)$$

The magnitude of $u_e^2$ is considered to be small and can be neglected accordingly. Eq. 15 is then reduced to:

Demodulated signal post-dithering after neglecting $u_e^2$     Eq. 15

$$\xi \approx -\frac{y''}{2}u_e\beta e^{-\gamma} + \frac{y''}{4}\beta^2 e^{-2\gamma}\sin\omega t - \frac{y''}{2}u_e\beta e^{-\gamma}\cos 2\omega t - \frac{y''}{8}\beta^2 e^{-2\gamma}(\sin 3\omega t - \sin\omega t)$$

Equation 15 comprises a number of high frequency signals which when passed through the integrator 7, yields Eqs. 16 and 17 below:

Approximation of the state signal     Eq. 16

$$\hat{x} \approx -\frac{k}{s}\frac{(e^{-\gamma}\beta y'')}{2}u_e$$

Similarly:

Approximation of the optimal perturbation signal     Eq. 17

$$\hat{u} \approx \frac{sk_c + 1}{s}\hat{x}$$

Substituting Eq. 16 into Eq. 17 yields:

$$\dot{\hat{u}} \approx zk_c u_e - z\hat{u}$$

Eq. 18: Approximation of the rate of change of the optimal perturbation signal where $$= \frac{(k\beta e^{-\gamma} y'')}{2}.$$

As u* is constant as shown in Eq. 8, its derivative can be written as:

$$\dot{u}_e = -\dot{\hat{u}} \quad \text{Eq. 19: Derivative of u* with respect to } \hat{u}$$

Substituting Eq. 18 into Eq. 19 yields:

Estimation error converging to extremum point     Eq. 20

$$\dot{u}_e = \frac{z}{1-z}k_c u_e$$

As $$u_e \xrightarrow{yields} 0,$$

and $e^{-\gamma}$ converges to a small region such that $0 < e^{-\gamma} < 1$, then û converges within a smaller region of u* with minimised oscillations. For the scheme described hereinabove wherein the low pass filter 6 is removed from the SDP-ESC loop, the output error y−y* achieves local exponential convergence to an O $(\beta^2 e^{-2\gamma})$ of the operating point with minimum oscillations, provided that the exponential decay is bounded such that $0 < e^{-\gamma} < 1$.

With respect to the choice of the parameters themselves, there are a number of considerations that must be made. Firstly, the frequency ω of the perturbation signal 34 must be sufficiently large but not equal to the frequency of any significant noise components else the tracking error will increase. The bounded noise is assumed to be uncorrected with perturbation signal, therefore noise should be bounded as per Eq. 21:

Bounded noise function     Eq. 21

$$f_n = \lim_{T\to\infty}\frac{1}{T}\int_0^T n\sin\omega t\, dt$$

Secondly, the perturbation gain β must be large enough to excite the plant 2 as well as to achieve a desired convergence speed. A large perturbation gain β will increase the convergence speed with minimum oscillations due to the exponentially decaying effect cause by the SDP-ESC function. If β is too small it may fail to excite the plant 2, especially when the SDP-ESC control system 1 is applied to low voltage applications. As the SDP-ESC function will decay exponentially close to zero, β can be selected to increase the rate of convergence to the extremum, as well as providing sufficient excitation to the plant 2.

The upper corner frequency $\omega_h$ and the lower corner frequency $\omega_l$ should be chosen after determining the frequency ω of the perturbation signal 34 such that ($\omega_h$, $\omega_l \ll \omega$). The upper corner frequency $\omega_h$ and the lower corner frequency $\omega_l$ should be bounded such that the high pass filter 4 removes any unwanted DC components. On the other hand, the low pass filter 6 should attenuate any unwanted high frequency components. The dynamics of these filters 4, 6 should be sufficiently fast enough to respond to perturbations.

Finally, it is important to select the exponential decaying constant α such that, var($\hat{x}$)<α. If α=0, there is no will be no effect on limit cycle minimisation, and the resulting SDP-ESC control system 1 will merely provide the same performance as a conventional ESC-based control system. Conversely, if α<0 is selected, the SDP-ESC function $f(\hat{x})$ will increase exponentially, causing the control system 1 to become unstable. Since the state signal dependent function $f(\hat{x})$ of Eq. 4 causes the perturbation gain β to decay exponentially to a small value when α>0 is selected, it is therefore apparent that selecting a large value of β introduces to the control system 1 neither unwanted oscillations nor sensitivity to noise. In order to successfully minimise limit cycles as well as ensure the control system 1 responds correctly, α should be bounded such that var($\hat{x}$)<α.

Figure 4:
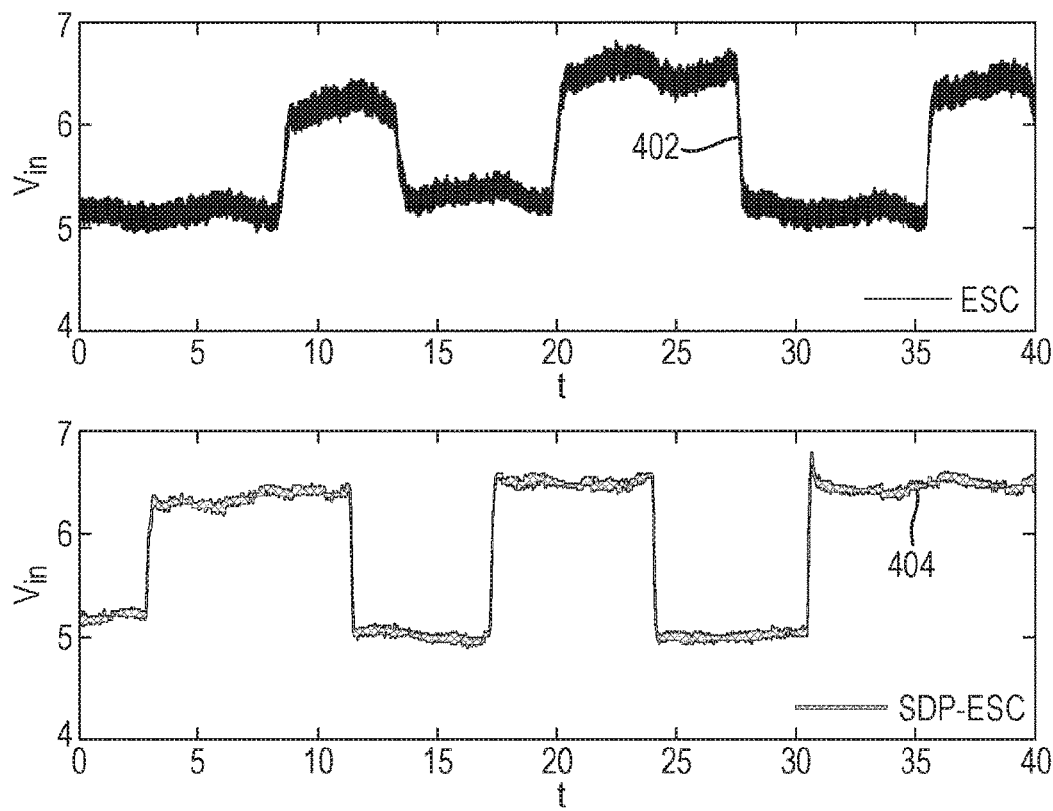
FIG. 4 shows a comparison of typical input voltages for a conventional ESC control system and an SDP-ESC control system in accordance with an embodiment of the invention.

FIG. 4 shows a comparison of typical input voltages for a conventional ESC control system and an SDP-ESC control system in accordance with an embodiment of the invention. The upper plot 402 shown in FIG. 4 shows the input voltage $V_{in}$ applied to the TEG system as described previously with reference to FIG. 2 using a conventional ESC control system. The lower plot 404 shows the input voltage $V_{in}$ applied to the TEG system using an SDP-ESC control system in accordance with an embodiment of the invention.

As can be seen by comparing the two plots, there is significantly less noise on the lower plot 404 than is present on the upper plot 402. This noise is due to the oscillations introduced by the ESC control system when large initial amplitudes are used. These oscillations hinder the performance of the system and thus the SDP-ESC control system is clearly an improvement over the conventional ESC method.

Figure 5A:
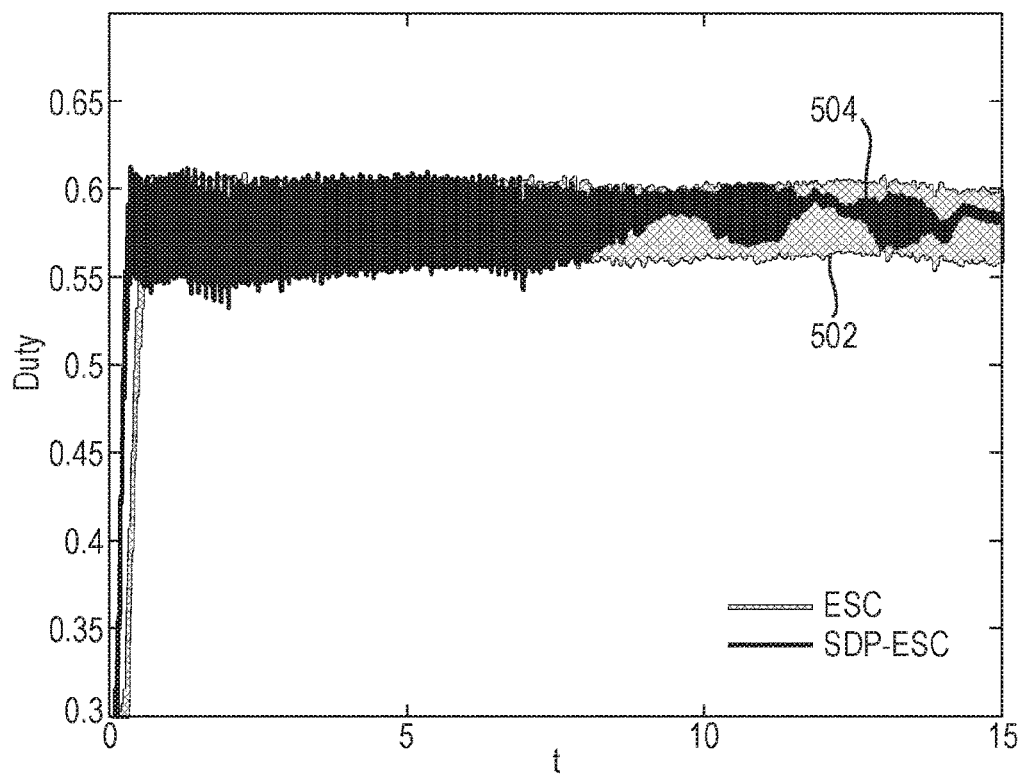
FIGS. 5A and 5B show a comparison of typical input voltage duty cycles for a conventional ESC control system and an SDP-ESC control system in accordance with an embodiment of the invention.
Figure 5B:
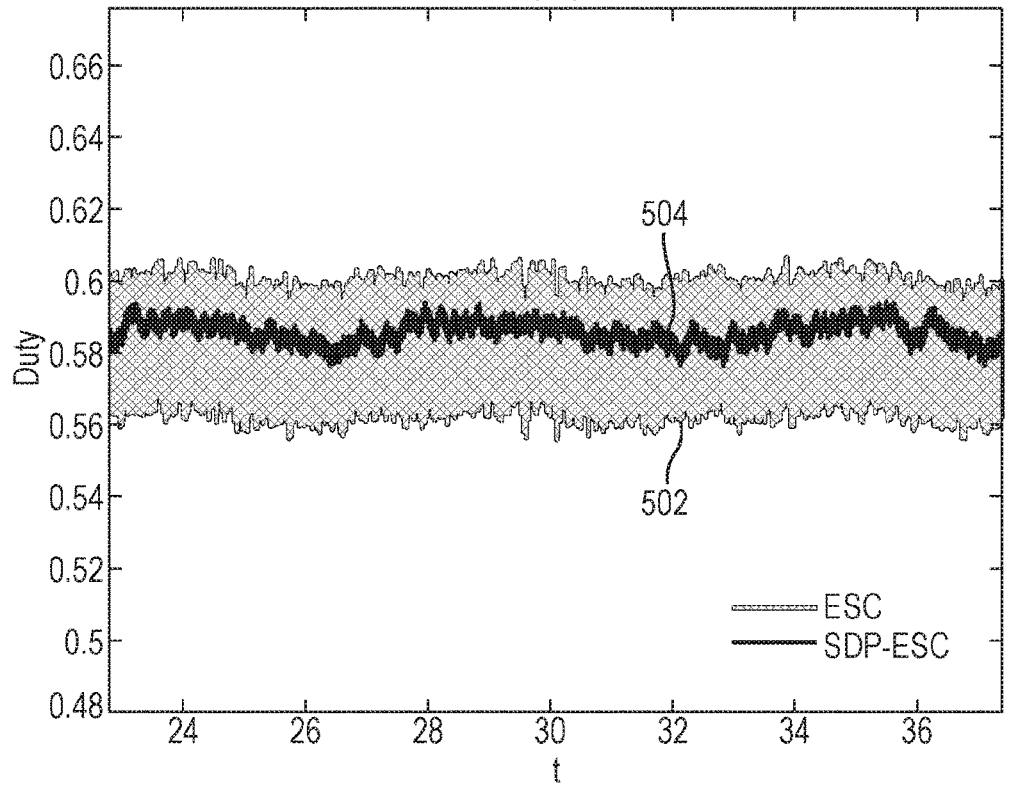

FIGS. 5A and 5B show a comparison of typical input voltage duty cycles for a conventional ESC control system and a control system in accordance with an embodiment of the invention. Both the ESC curve 502 and the SDP-ESC curve 504 both suffer from large oscillations in the input duty cycle initially. However, the oscillations on the SDP-ESC curve 504 are reduced in a relatively short period of time while the oscillations on the ESC curve 502 remain relatively constant over time.

FIG. 5B shows a further comparison of typical input voltage duty cycles at a later time. As can be seen, even once the system has been given time to settle, the oscillations are still present on the ESC curve 502 whereas the SDP-ESC curve 504 is relatively smooth.

Thus it will be seen that a control system and method have been described which achieves fast convergence while minimising oscillations and losses on the output of a controlled plant. Although particular embodiments have been described in detail, it will be appreciated by those skilled in the art that many variations and modifications are possible using the principles of the invention set out herein. The scope of the present invention is defined by the following claims.

The invention claimed is:

1. A control system for controlling a plant, the control system comprising a feedback loop including an integrator; a signal generator; and a scaling unit, wherein the control system is configured such that:
the feedback loop comprises an input configured to be connected to an output of the plant;
the integrator integrates a signal received from the input to generate a state signal $\hat{x}$;
the signal generator generates a periodic base perturbation signal with an initial amplitude;
the scaling unit generates a scaling factor having a first value if the variance of the state signal var($\hat{x}$) is zero, or a second value if the variance of the state signal is non-zero, wherein the second value is proportional to $$e^{\frac{-1}{var(\hat{x})}};$$

wherein the scaling unit is arranged to multiply the initial amplitude of the periodic base perturbation signal by the scaling factor to produce a state dependent perturbation signal, which is provided at an output of the control system configured to be connected to an input of the plant so as to drive the plant to a desired operating point.

2. The control system of claim 1, wherein the signal generator is arranged to generate a periodic base perturbation signal that is sinusoidal.

3. The control system of claim 1, wherein a function $f_n$ representing noise in the control system is bounded according to:

$$f_n = \lim_{T \to \infty} \frac{1}{T} \int_0^T n \sin \omega t \, dt;$$

wherein sin ωt represents the periodic base perturbation signal having a perturbation frequency ω.

4. The control system of claim 1, wherein the second value has a lower limit equal to the first value.

5. The control system of claim 1, wherein the second value is proportional to $$e^{\frac{-\alpha}{var(\hat{x})}},$$

wherein α is a decay constant chosen to set the rate of exponential decay of the scaling factor.

6. The control system of claim 1, wherein the second value of the scaling factor is $$\beta e^{\frac{-\alpha}{var(\hat{x})}},$$

wherein α is a decay constant chosen to set the rate of exponential decay of the scaling factor and β is a perturbation gain.

7. The control system of claim 6, wherein the state dependent perturbation signal is represented as a function of the state signal $\hat{x}$ according to:

$$f(\hat{x}) = \begin{cases} \beta e^{\frac{-\alpha}{var(\hat{x})}}, & \text{if } var(\hat{x}) < \alpha \text{ and } var(\hat{x}) \neq 0 \\ \beta, & \text{otherwise} \end{cases}.$$

8. The control system of claim 5, wherein the constant α is positive.

9. The control system of claim 5, wherein the constant α is selected such that var($\hat{x}$)<α.

10. The control system of claim 1, wherein the scaling unit is arranged to produce a state dependent perturbation signal having a gain β that is large enough to excite the control system.

11. The control system of claim 1, wherein the feedback loop comprises a shifting unit arranged to provide an offset value.

12. The control system of claim 11, wherein the shifting unit is arranged such that the offset value is added to the state dependent perturbation signal.

13. The control system of claim 11, wherein the shifting unit is a compensator.

14. The control system of claim 1, wherein the feedback loop comprises a high pass filter having a cut-off frequency $\omega_h$ that satisfies $\omega_h \ll \omega$, where $\omega$ is the frequency of the periodic base perturbation signal.

15. The control system of claim 1, wherein the feedback loop comprises a low pass filter having a cut-off frequency $\omega_l$ that satisfies $\omega_l \ll \omega$, where $\omega$ is the frequency of the periodic base perturbation signal.

16. The control system of claim 1, wherein the feedback loop comprises a bandpass filter comprising a high pass filter with a first corner frequency and a low pass filter with a second corner frequency, wherein the first corner frequency is greater than the second corner frequency.

17. The control system of claim 16, wherein the bandpass filter is arranged to filter the input before passing the filtered input signal to the integrator.

18. The control system of claim 16, wherein the output of the high pass filter is multiplied with the periodic base perturbation signal prior to passing through the low pass filter.

19. A method of controlling a plant, the method comprising:

Obtaining, by a feedback loop, an input signal to the feedback loop connected to an output signal of the plant;

integrating the output signal from the plant to generate a state signal $\hat{x}$;

generating, by a signal generator, a periodic base perturbation signal with an initial amplitude;

generating, by a scaling unit, a scaling factor having a first value if the variance of the state signal var($\hat{x}$) is zero, or a second value if the variance of the state signal is non-zero, wherein the second value is proportional to $$e^{\frac{-1}{var(\hat{x})}};$$

multiplying, by the scaling unit, the initial amplitude of the periodic base perturbation signal by the scaling factor to produce a state dependent perturbation signal; and inputting the state dependent perturbation signal to the plant so as to drive the plant to a desired operating point.

20. The control system of claim 13, wherein the shifting unit is a proportional-integral-derivative (PID) controller.

* * * * *